US012652163B2

(12) United States Patent
Nelson et al.

(10) Patent No.: US 12,652,163 B2
(45) Date of Patent: Jun. 9, 2026

(54) SECURITY KEY DISTRIBUTION

(71) Applicant: Ford Global Technologies, LLC, Dearborn, MI (US)

(72) Inventors: Jacob David Nelson, Westland, MI (US); Dikshitha Naidu Changala Raya, Dublin, CA (US); Jochen Schubert, Westland, MI (US); Cameron Smyth, Wyandotte, MI (US); Kevin Thomas Hille, Plymouth, MI (US); Antony Mihalopoulos, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 209 days.

(21) Appl. No.: 18/613,483

(22) Filed: Mar. 22, 2024

(65) Prior Publication Data

US 2025/0300815 A1      Sep. 25, 2025

(51) Int. Cl.
*H04L 29/06* (2006.01)
*H04L 9/08* (2006.01)

(52) U.S. Cl.
CPC .................................. *H04L 9/0838* (2013.01)

(58) Field of Classification Search
None
See application file for complete search history.

(56) References Cited

U.S. PATENT DOCUMENTS

| | | | | | |
|---|---|---|---|---|---|
| 7,813,822 | B1 * | 10/2010 | Hoffberg | ................ | H04N 7/163 381/73.1 |
| 9,049,181 | B2 * | 6/2015 | Noda | ..................... | H04L 9/0833 |
| 12,407,506 | B2 * | 9/2025 | Du | ............................ | H04L 9/14 |

(Continued)

FOREIGN PATENT DOCUMENTS

| | | |
|---|---|---|
| DE | 10355605 A1 | 6/2005 |
| EP | 3148152 A1 | 3/2017 |

(Continued)

OTHER PUBLICATIONS

Li, Congwu et al. Mimosa: Protecting Private Keys Against Memory Disclosure Attacks Using Hardware Transactional Memory. IEEE Transactions on Dependable and Secure Computing, vol. 18, Issue: 3. https://ieeexplore.ieee.org/stamp/stamp.jsp?tp=&arnumber= 8634944 (Year: 2021).*

(Continued)

*Primary Examiner* — Jeremiah L Avery
(74) *Attorney, Agent, or Firm* — Christopher Storms; Brooks Kushman P.C.

(57) ABSTRACT

Communications between computing devices connected via a network can be secured with digital keys (e.g., encryption keys). The key may be updated based on states of a state machine. The computing device may receive a key update command to update a key value. In response to the key update command, the computing device may update the key value upon determining that the computing device is in a first state based on state data defining the first state, the state data including the key value, a machine mode specifying a current operating environment, and a lock value specifying that memory storing the key value is one of locked or unlocked.

20 Claims, 5 Drawing Sheets

(56) References Cited

U.S. PATENT DOCUMENTS

| | | | | |
|---|---|---|---|---|
| 2011/0252243 A1* | 10/2011 | Brouwer | ................. | G06F 21/62 |
| | | | | 713/189 |
| 2015/0052369 A1* | 2/2015 | Koning | ................. | H04L 9/0894 |
| | | | | 713/193 |
| 2016/0059825 A1 | 3/2016 | Coombs | | |
| 2018/0117446 A1* | 5/2018 | Tran | ........................ | G06F 1/163 |
| 2020/0076594 A1* | 3/2020 | Audley | .................... | G09C 1/00 |
| 2021/0009080 A1* | 1/2021 | Hu | .......................... | G06V 10/82 |
| 2021/0136051 A1* | 5/2021 | Kim | ........................ | H04W 4/48 |
| 2021/0160064 A1* | 5/2021 | Harata | ................. | H04L 9/0891 |
| 2021/0203496 A1* | 7/2021 | Cariello | ............. | G06F 12/1441 |
| 2022/0012735 A1* | 1/2022 | Wilson | ................. | G06Q 20/353 |
| 2025/0300815 A1* | 9/2025 | Nelson | ................. | H04L 9/0838 |

FOREIGN PATENT DOCUMENTS

| | | |
|---|---|---|
| GB | 2436374 A | 9/2007 |
| WO | 2023054298 A1 | 4/2023 |
| WO | 2023061029 A1 | 4/2023 |

OTHER PUBLICATIONS

Nilsson, Dennis K.; Larson, Ulf E. Secure Firmware Updates over the Air in Intelligent Vehicles. ICC Workshops—2008 IEEE International Conference on Communications Workshops. https://ieeexplore.ieee.org/stamp/stamp.jsp?tp=&arnumber=4531926 (Year: 2008).*

Mansour, Karim et al. AiroDiag: A sophisticated tool that diagnoses and updates vehicles software over air. : 2012 IEEE International Electric Vehicle Conference. https://ieeexplore.ieee.org/stamp/stamp.jsp?tp=&arnumber=6183181 (Year: 2012).*

* cited by examiner

400

SECURITY KEY DISTRIBUTION

BACKGROUND

Communications between computing devices connected via a network can be secured with digital keys (e.g., encryption keys). For example, a device may use an encryption key to encrypt a communication sent over the network for other devices and/or may use the encryption key or an encryption key to decrypt communications from another device received via the network. A security key can be initially installed or deployed (e.g., a security key in a device can be updated from a default or initial security key). Alternatively or additionally, from time to time, a security key may be updated.

DETAILED DESCRIPTION

Introduction

Figure 1:
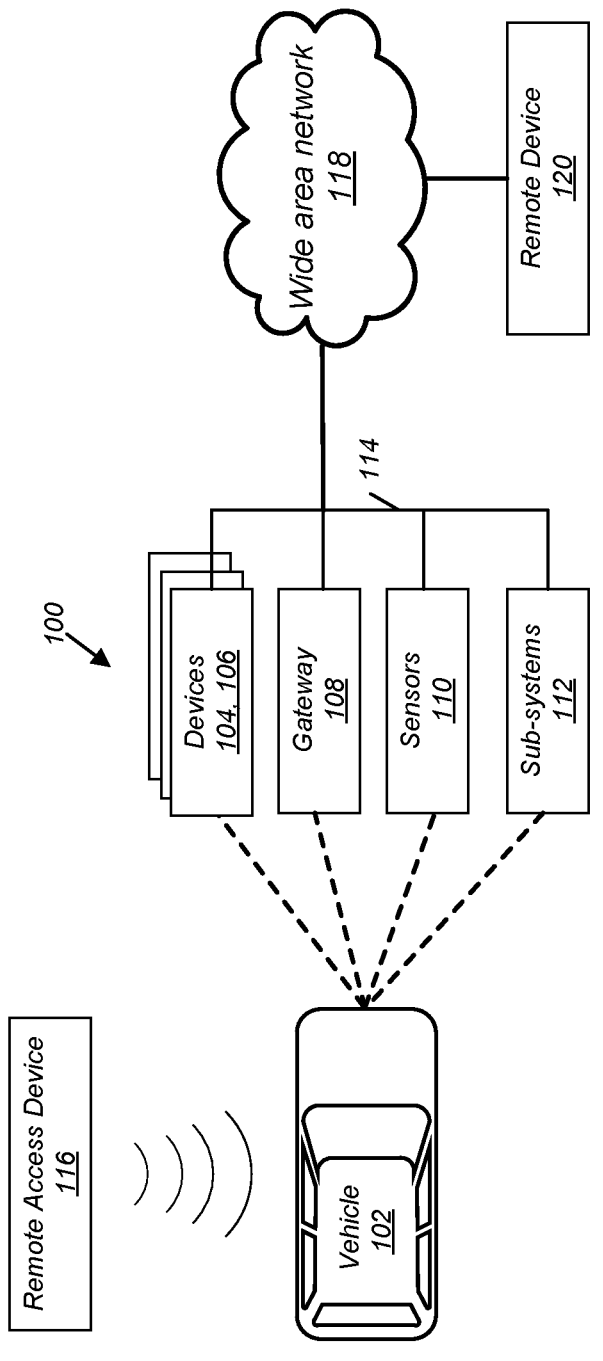
FIG. 1 is a block diagram of an example vehicle.

Described herein are techniques for managing, distributing, and/or updating of security keys to computing devices via a network. In a nonlimiting example discussed herein, the computing devices are electronic control units (ECUs) connected to a network in a vehicle. The computing devices can communicate with each other according to a stored security key. For example, communications can be sent via a vehicle communication bus that are encrypted with the security key. As described herein, respective devices such as ECU's can manage security keys, including installation and/or updating of security keys, by maintaining a state machine that determines whether a state of the device permits and/or warrants updating the security key (e.g., from a default security key and/or from a previously installed or updated security key). As described in more detail below, the state machine can track attributes of a computing device including whether it is in a locked or unlocked condition, whether it is in an initial mode or and in-service mode, and/or whether a security key value is a default value or a previously distributed or installed value to determine whether the device is in a state to update a security key, install a security key, and/or revert a security key to a default value.

Accordingly, included in the present disclosure is a system comprising a computing device, the computing device including a processor and a memory, the memory storing instructions executable by the processor, including instructions to: receive a key update command to update a key value and, in response to the key update command, update the key value upon determining that the computing device is in a first state based on state data defining the first state, the state data including the key value, a machine mode specifying a current operating environment, and a lock value specifying that memory storing the key value is one of locked or unlocked.

A second state may be transitioned to after updating the key value.

The computing device may be allowed to authenticate communications with the key value based on the second state.

The machine mode may change from the first state to the second state.

The first state may be a default state and a key value in the default state may be a default value.

The computing device may be configured for communication with a second computing device via a network.

A gateway computing device may be configured to provide the key update command, via the network, to the computing device.

The gateway may be further configured to provide the key update command based on determining that the computing device is in the first state.

The computing device may be an electronic control unit (ECU) for a vehicle.

The first state may be transitioned to from an error state.

A method comprises: receiving a key update command to update a key value and, in response to the key update command, updating the key value upon determining that the computing device is in a first state based on state data defining the first state, the state data including the key value, a machine mode specifying a current operating environment, and a lock value specifying that memory storing the key value is one of locked or unlocked.

A second state may be transitioned to after updating the key value.

The computing device may be allowed to authenticate communications with the key value based on the second state.

The machine mode may change from the first state to the second state.

The first state may be a default state and a key value in the default state may be a default value.

The computing device may be configured for communication with a second computing device via a network.

A gateway computing device may be configured to provide the key update command, via the network, to the computing device.

The gateway may be further configured to provide the key update command based on determining that the computing device is in the first state.

The computing device may be an electronic control unit (ECU) for a vehicle.

The first state may be transitioned to from an error state.

Exemplary System Elements

FIG. 1 is a block diagram of a vehicle system 100. The vehicle 102 includes computing devices 104, 106, 108 including a security manager 104, one or more control devices 106, and/or a gateway 108. A control device 106 may be an electronic control unit (ECU), for example. Each computing device 104, 106, 108 may have a memory that includes instructions executable by the computing device 104, 106, 108 to carry out processes and operations including as described herein. Computing devices 104, 106 may be communicatively coupled via a communication network, such as a vehicle network 114, with a gateway 108, sensors 110, and vehicle subsystems 112 such as a powertrain controller, a steering controller, etc. The vehicle 102 may be any passenger or commercial automobile such as a car, a truck, a sport utility vehicle, a crossover, a van, a minivan, a taxi, a bus, etc.

Each computing device 104, 106, 108 includes a processor and a memory. The memory includes one or more forms of computer readable media, and stores instructions executable by the processor for performing various operations, including as disclosed herein. For example, the control device 106 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation (e.g., an ASIC for processing sensor data and/or communicating the sensor data). In another example, the computing device 104, 106, 108 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided premanufacturing, whereas logical components inside an FPGA may be configured based on VHDL programming (e.g. stored in a memory electrically connected to the FPGA circuit). In some examples, a combination of processor(s), ASIC(s), and/or FPGA circuits may be included in the computing device 104, 106, 108.

The memory includes any suitable types of memory as known. Types of memory may be hard disk drives, solid state drives, servers, or any volatile or non-volatile media. The memory can include a separate device from the computing device 104, 106, 108, and the computing device 104, 106, 108 can retrieve information stored by the memory via the network 114 in the vehicle 102 (e.g., over a CAN bus, a wireless network, etc.). Alternatively or additionally, the memory can be part of the computing device 104, 106, 108 (e.g., as a memory of the computing device 104, 106, 108).

The computing devices 104, 106, 108 may include or be communicatively coupled to (e.g., via the vehicle network 114 such as a communications bus as described further below), more than one processor (e.g., included in components such as sensors 110, control devices 106 such as electronic control units (ECUs) or the like included in the vehicle 102 for monitoring and/or controlling various vehicle components or subsystems 112 (e.g., a powertrain controller, a steering controller, etc.)). The computing device 104, 106, 108 is generally arranged for communications on the vehicle communication network 114 that can include a bus in the vehicle 102 such as a controller area network CAN or the like, and/or other wired and/or wireless mechanisms. Alternatively or additionally, in cases where the computing device 104, 106, 108 actually comprises a plurality of devices, the vehicle communication network 114 may be used for communications between devices represented as the computing device 104, 106, 108 in this disclosure. Further, as mentioned below, various controllers and/or sensors 110 may provide data to a computing device 104, 106, 108 via the vehicle communication network 114.

Via the vehicle network 114, the computing devices 104, 106, 108 may transmit and/or receive message to/from various devices in the vehicle 102 including sensors 110; actuators; other computing devices 104, 106, 108; etc. Various controllers and/or sensors 110 may provide data to the computing devices 104, 106, 108 via the vehicle network 114. The vehicle network 114 can be one or more of a combination of wired and/or wireless networks, such as a CAN (Controller Area Network) bus and/or can also include ethernet, Wi-Fi, etc.

The vehicle 102 may include a security manager 104 for monitoring of the communications of control devices 106 and remote access device 116 and for controlling operations of vehicle subsystems 112. The security manager 104 may include a processor and a memory storing instructions executable by the security manager 104 and be communicatively coupled via the vehicle network 114 to control devices 106 as well as vehicle subsystems 112. The security manager 104 may communicate (e.g., exchange messages) with control devices 106. That is, the security manager 104 may forward instructions to the control device 106 to, for example, actuate a vehicle subsystem 112. The security manager 104 may require that the control devices 106 authenticate themselves to the security manager 104. When at least one of the control devices 106 is unsuccessful in an authentication, the security manager 104 may "immobilize" the vehicle 102 by disallowing the operation of the vehicle subsystem 112. For example, when some control devices 106 are unsuccessful in authenticating, the security manager 104 may prevent the actuation of an ignition system in the vehicle 102.

As mentioned above, the security manager 104 may be configured for wireless communication with the remote access device 116. The security manager 104 and the remote access device 116 may wirelessly communicate according to a wireless protocol such as WiFi or Bluetooth, for example. An example communication from the remote access device 116 to the security manager 104 is a request to actuate a vehicle subsystem 112 such as a vehicle ignition or propulsion activation, unlocking doors, etc. The security manager 104 may forward the request to the control device 106 such that the control device 106 may actuate the vehicle subsystems 112 based on the request.

As mentioned above, the security manager 104 may communicate with computing devices 106, 108. Communications between the security manager 104 and the computing devices 106, 108 may be encrypted with a security key. That is, a security key value may be used to encipher a communication according to a stored algorithm such that the communication is undecipherable without access to the security key. The security manager 104 and the computing devices 106, 108 may store the security key to encrypt and decrypt communications.

Authentication of messages in the computing device 104, 106, 108 such as the control device 106 may employ various suitable mechanisms such as a message authentication code (MAC) (sometimes also referred to as a Message Integrity Code, or MIC). MAC authentication can include inputting the security key and a message to a signing algorithm to output a tag; a verifying algorithm can then verify that the message is authentic (or is to be rejected) using the tag and the security key as input. MAC authentication may be used in cypher based message authentication codes (CMAC). CMAC authentication can include a block cipher as will be understood.

The security manager 104 may be in communication with the remote access device 116. The remote access device 116 is a device that may be configured to wirelessly communicate with the security manager 104 (e.g. via Bluetooth). The remote access device 116 may be any device suitable to wirelessly communicate with the security manager 104. The remote access device 116 can be a dedicated device (e.g. a key-fob, such as a (radio-frequency identification) RFID device). Additionally, or alternatively, the remote access device 116 may be a portable computing device such as a smartphone. The remote access device 116 may be actuated by a vehicle operator to send a command to the security manager 104 to actuate a vehicle subsystem 112. As an example, the remote access device 116 may send a command via the security manager 104 instructing the control device 106 to unlock the vehicle doors. The remote access device 116 may store a security key shared among the control devices 106 such that when the remote access device 116 sends a communication to the security manager 104, the security manager 104 is able to authenticate the remote access device 116. The remote access device 116 may be detected by sensors 110 within an interior of the vehicle 102. Based on detecting the remote access device 116 in the interior of the vehicle 102, the security manager 104 may actuate vehicle subsystems 112.

The control devices 106 may, via the gateway 108, receive wired or wireless communications from the remote device 120. The remote device 120 is shown in FIG. 1 as communicating with the gateway 108 via the wide area network 118 and the vehicle network 114, but in many examples could be connected directly (e.g. via a wired connection) to the vehicle network 114. As an example communication, the remote device 120 could command a security key update to the computing devices 104, 106, 108 via the gateway 108.

The vehicle may include the gateway 108. The gateway 108 may be connected to a plurality control devices 106 such as ECU's over one or more vehicle buses. The gateway 108 may be configured to transmit signals between different vehicle buses connected to the gateway 108. The gateway 108 may include processors and a memory storing instructions executable by the processor. The gateway 108 may receive communications from the remote device 120 and forward the communications to the control devices 106.

The vehicle 102 typically includes a variety of sensors 110. A sensor 110 is a device that can obtain one or more measurements of one or more physical phenomena. Some sensors 110 detect internal states of the vehicle 102, for example, wheel speed, wheel orientation, and engine and transmission variables. Some sensors 110 detect the position or orientation of the vehicle 102, for example, global positioning system GPS sensors. Some sensors 110 detect objects, for example, radar sensors, scanning laser range finders, light detection and ranging LIDAR devices, and image processing sensors such as cameras. Further sensors 110 detect sounds, for example dynamic or condenser microphones, piezoelectric transducers, ultrasonic sensors, acoustic emission sensors, etc.

The wide area network 118 represents one or more mechanisms by which the computing device 104, 106, 108 may communicate with remote computing devices (e.g., the remote device 120, another vehicle computer, etc.). Accordingly, the wide area network 118 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
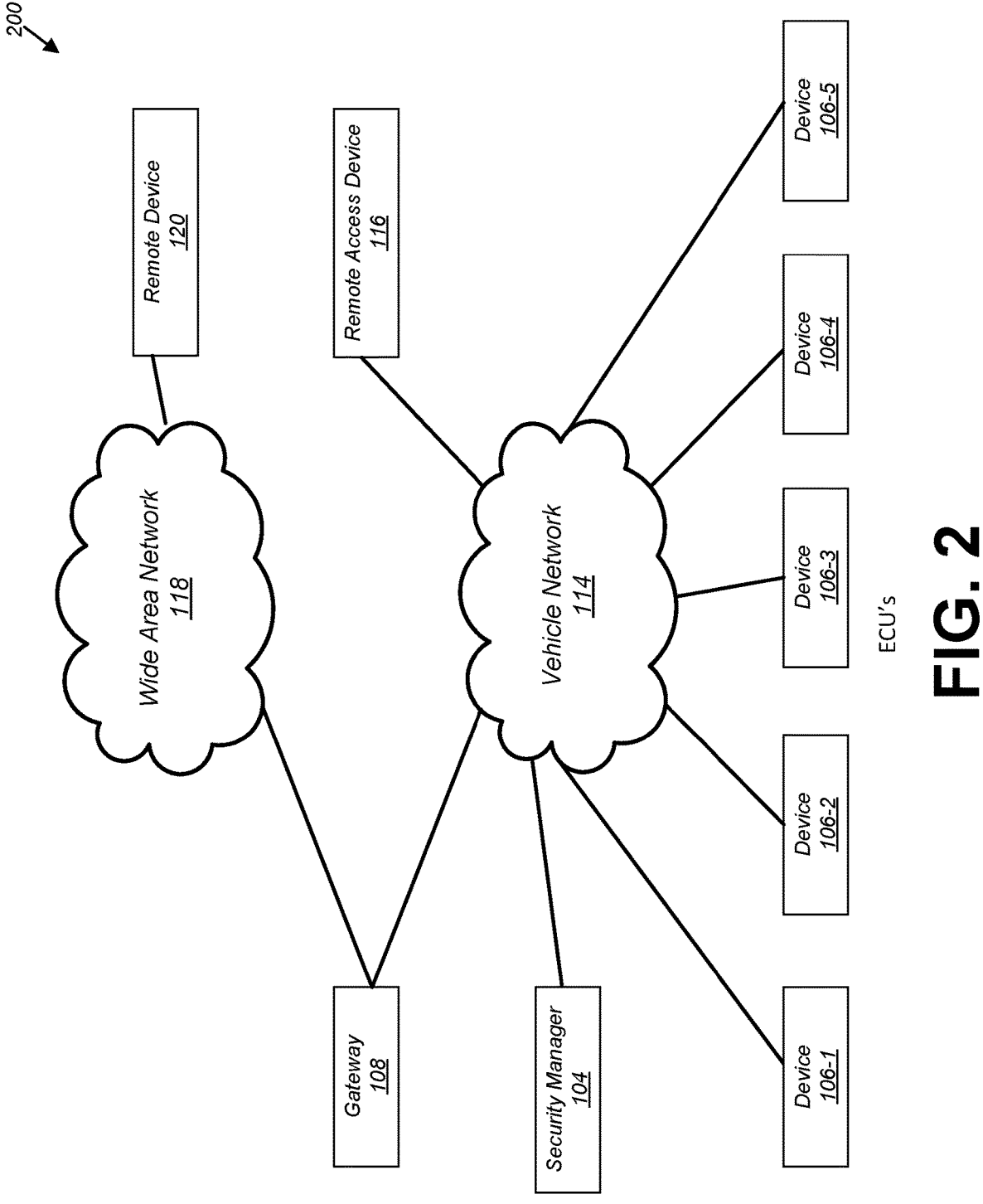
FIG. 2 illustrates an example device network.

Now referring to FIG. 2 along with FIG. 1, a communication system 200 is illustrated that includes the vehicle network 114 and the wide area network 118 with devices 104, 106, 108, 116, and 120 arranged to communicate via one or both of the networks 114, 118. The computing devices 104, 106, 108 can receive communications from the remote device 120 via the wide area network 118 and the gateway 108. The remote device 120 may transmit security keys that are to be distributed to devices 104, 106 to the gateway 108.

The system 200 typically includes a plurality of control devices 106-1, 106-2, 106-3, 106-4, 106-5. Various ones of the control device 106 may be programmed or configured to provide commands to actuate or control vehicle components in a vehicle subsystem 112 such as propulsion, ignition, etc. The computing devices 104, 106, 108 can exchange communication with other computing devices 104, 106, 108 as well as the remote access device 116 via the vehicle network 114.

As an example security key distribution, the remote device 120 may send a message including an updated security key (i.e., to replace a default security key and/or a previously updated security key) over the wide area network 114 to the control devices 106 via the gateway 108 via Wi-Fi. That is, the remote device 120 may send a message intended to reach at least one of the control devices 106. The message is first received by the gateway 108 and then broadcast and/or forwarded over the vehicle network 114 to be received by one or more of the control devices 106.

The control devices 106 may determine whether to allow or reject an update to the security key to which the control device 106 has access based on whether the control device 106 is in a state in which the update is permitted. For example, control device 106 may store instructions to deny a key update when the vehicle 102 in which the control device 106 is installed is in a service mode and the value of the security key is a specified default value. Alternatively, or additionally, the control device 106 may allow a security key update when the vehicle 102 is in a vehicle operation mode and the key is a non-default value.

The control device 106 may implement a finite state machine to determine whether to update the security key. A finite state machine can be implemented according to programming in the control device 106, that transitions the control device 106 from a first state (or a start condition) to a second state based on changes to one or more variables or values, and typically taking into account the first state (e.g., a same value may transition a first state to a second state, and a third state not to the second state, but to a fourth state). For example, one or more changed values in a state machine may result in the state machine determining a state transition of the control device 106 from a first state to a second state. Thus, a finite state machine herein means a model that includes a finite plurality of states, and that can transition between the states (i.e., from a first state to a second state) where the second state is determined or selected from the plurality of states based on one or more values received when the finite state machine is in the first state. Note that the modifiers "first," "second," etc., in the present context are for convenience and do not necessarily connote an order of priority or an order in which states are selected or visited in the state machine.

Implementation of the finite state machine as described herein can enhance security of communications between networked devices (e.g., devices 106 on a network 114 in a vehicle 102). Further, security of a machine including or using networked devices can also be enhanced. For example, providing for secure key updates of control devices 106 in the vehicle 102 can enhance security of the vehicle 102. In one example, if a bad actor attempted to replace a control device 106 in the vehicle 102 with an unauthorized or malign control device 106 to thereby steal or misappropriate the vehicle 102, enforcing secure key updates could help prevent or hobble the bad actor's attempt to misappropriate the vehicle 102.

Figure 3:
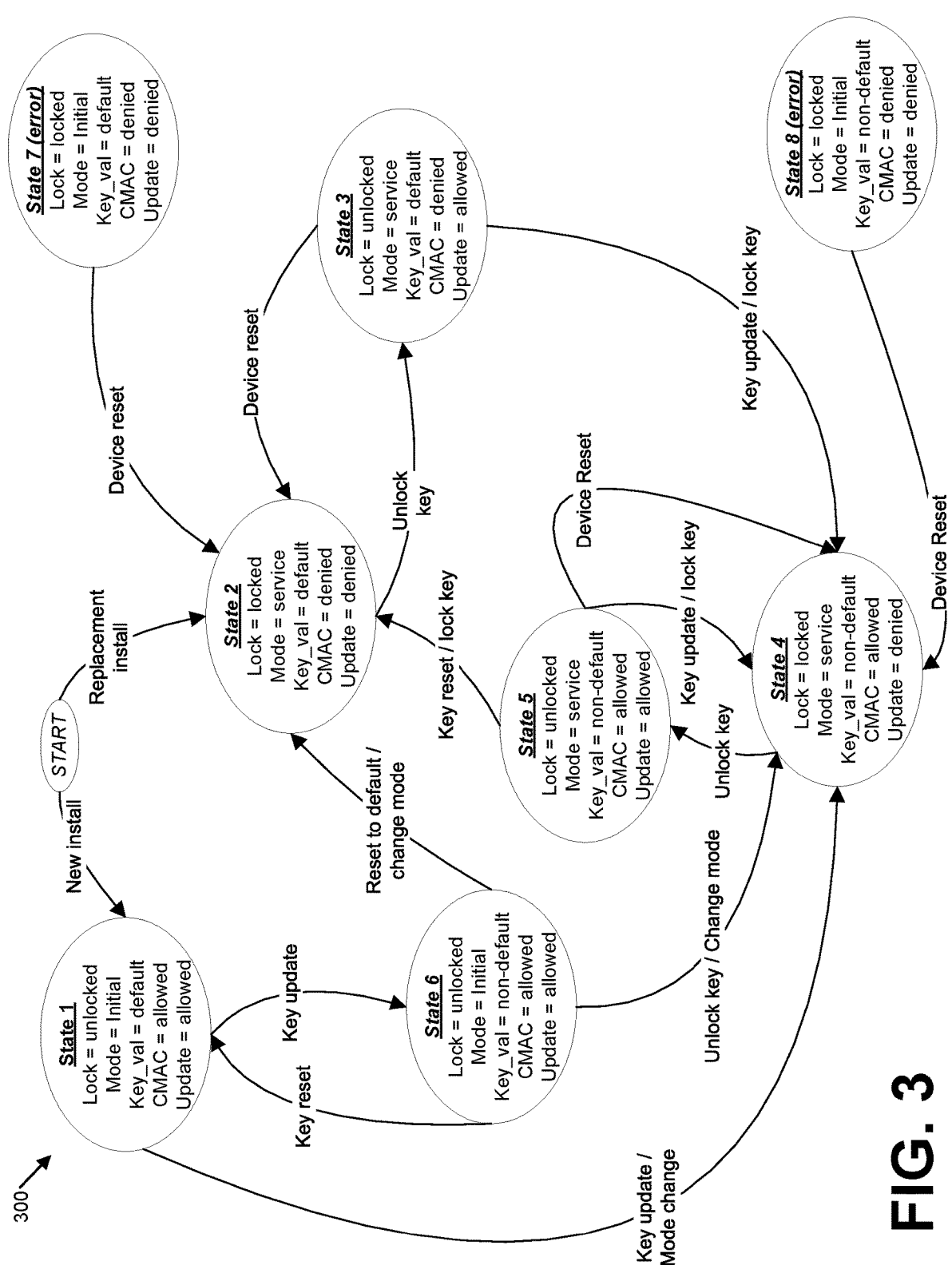
FIG. 3 is a state diagram illustrating a state machine for key distribution.

In FIG. 3, now referred to along with FIGS. 1-2, an example state diagram is illustrated including various states and the values to transition between states. The control device 106 may determine that a state machine being executed in the device 106 is in a first state based on state data defining the first state. State data illustrated in the present example includes:

| State | Definition |
|-------|-----------|
| Lock | Specifies whether a security key can be updated or changed; can be "locked" (no change or update possible) or "unlocked" (change or update possible). That is, a locked key value is impossible to change and an unlocked key value could be changed. |
| Mode | Specifies a current operating environment or mode of a machine including the device 106 (e.g., a vehicle 102). Typically, the mode specifies whether the machine is in a pre-service mode (e.g., is in a factory environment before deployment to field use) or a service mode (e.g., has been deployed for field use). The pre-service mode may be referred to as "initial" and the service mode may be referred to "in-service" or "service." |
| Key_val | Value of a security key (i.e., a string of data representing the security key) currently stored in a device 106; for purposes of the state machine a device 106 may determine that the kay value is either a default value (i.e., a value provided when the device 106 is initially installed in the vehicle 102 or when the device 106 has been reset) or a non-default value (i.e., the key has been updated from the default value). |
| CMAC Allowed | Specifies whether CMAC communications (i.e., CMAC authentication) between devices 104, 106, 108 permitted. If allowed, the devices 104, 106, 108 may communicate using the key in a MAC algorithm. If denied, no communication between devices 104, 106, 108 may occur. |
| Update Allowed | Specifies whether the key_val is permitted to be updated by the device 106. |

The table below (Table 1), which can be referred to as a "state table," lists state values corresponding to the state diagram illustrated in FIG. 3:

TABLE 1

| State | Mode | Key Value | Key lock | CMAC Allowed | Update Allowed |
|-------|------|-----------|----------|--------------|----------------|
| State 1 | Initial | Default | Unlocked | Allowed | Allowed |
| State 6 | Initial | Non-default | Unlocked | Allowed | Allowed |
| State 3 | Service | Default | Unlocked | Denied | Allowed |
| State 5 | Service | Non-default | Unlocked | Allowed | Allowed |
| State 2 | Service | Default | Locked | Denied | Denied |
| State 4 | Service | Non-default | Locked | Allowed | Denied |
| State 7 | Initial | Default | Locked | Denied | Denied |
| State 8 | Initial | Non-default | Locked | Denied | Denied |

Table 1 provides values for state values (i.e., values of state data) in respective states in the example state machine of FIG. 3. In examples described herein, a computing device 104, 106, 108 can determine a current state by determining values for mode, key value, key lock, and CMAC allowed state data. Then by determining the current state, the computing device 104, 106, 108 can determine whether an update to the key value is or is not permitted (i.e., is allowed or denied). For example, state data in state 1 can have the following values: the mode is initial, the key state is default (i.e. the key is a specified default value), key lock is unlocked (i.e. it is possible to update the key value), and an update to the key value is allowed. Accordingly, in state 1, the control device 106 may receive and execute a key update command (e.g., from the remote device 120 via the gateway 108) to update the key value.

The following Boolean equation (equation 1) can be used to determine the "CMAC Allowed" state value (i.e., if the equation evaluates to "true" then CMAC authentication of communication between computing devices 104, 106, 108 is allowed, and if not true or "false" then CMAC authentication of communication is denied (not allowed)). Typically, CMAC allowed means that the computing device 104, 106, 108 has a non-default security key and other state values indicate that CMAC authentication is permitted, and therefore communications can occur between computing devices 104, 106, 108. CMAC denied can occur when there is a non-default security key value (see State 8), and also occurs when the computing device 104, 106, 108 has a default security key. For the equation, the initial mode is "true" when in initial mode and false otherwise, key state is "true" if a default value and false otherwise, and key lock is true if "unlocked."

$$\text{CMAC communication allowed} = \text{initial mode OR}$$
$$(\text{key state NOT default}) \text{ AND NOT error state}$$

Equation 1:                  Equation 1:

The state machine may transition from a first state (or initial or entry condition) to a second state based on one or more "transition events." A transition event herein means a happening or occurrence that changes a state value of the state machine, such as the receipt of data or a change in the physical status of the computing device 104, 106, 108. The control device 106 can transition the state machine to a second state from a first state upon detecting one or more transition events. A transition event could be receipt of a command or data from the remote device 120 connected to the vehicle 102. For example, a transition event may include a command to update a security key value from a default value to a non-default value, or to update or reset a non-default value to a default value, or to update a non-default value. As an example, a transition event including a command to distribute a key update (a "key update" command) transitions the state machine from state 3 to state 4 and from state 1 to state 6. In another example, referring to FIG. 3, the state machine transitions from state 5 to state 2 based on an event. In such an example, the event may be "key reset" and "lock key" commands sent by the remote device 120 to the control device 106. The same event may transition the state machine to different second states depending on which state is the first state when an event occurs. For example, a "device reset" event transitions to state 2 if the state machine is in state 3, but transitions to state 4 if the state machine is in state 8.

Transition events including commands may be sent to the control devices 106 by the remote device 120 according to user input to the remote device 120, (e.g., by a technician or the like).

Transition events in FIG. 3 are represented by the labeled arrows. Table 2 below provides explanations of the respective transition events.

TABLE 2

| Transition Event | Explanation |
| --- | --- |
| Key Update | Command received to update a key value. |
| Key reset | Command received to reset a key value to a default value. |
| Mode change | Change of mode (e.g., from "initial" to service or vice-versa). |
| Unlock key | Command received to unlock a key in memory (i.e., allow the memory location storing the key value to be updated). |
| Lock key | Command received to lock a key in memory (i.e., disallow the memory location stored the key value from being updated). |
| New install | Device installed in new vehicle (i.e., not previously in service). |
| Replacement install | Device installed in new vehicle (i.e., not previously in service). |
| Device reset | Device reset to specified reset values. When in service mode, reset will lock the key. When in initial mode, reset will unlock the key. |

Upon a first activation of a control device 106, the state machine may enter either state 1 or state 2 depending on whether a transition even includes a new install or a replacement install.

State 1 is reached from a start or entry condition upon a new install of the control device 106 in a vehicle 102. State 1 includes the following state values: the current machine mode is initial; the key value of the stored key is a default value; and the key is unlocked. The "CMAC allowed" value is "allowed." Further, the update value is "allowed." Therefore, while in state 1, control devices 106 may allow updates to the security key and perform CMAC communications with other control devices 106. The state machine 300 transitions from state 1 to state 4 when the remote device 120 sends a key update command and there is a mode change. The state machine 300 transitions from State 1 to State 6 on receiving the key update command but no mode change. Because the key value is unlocked in State 1, the key is updated to a non-default value supplied by the key update command as reflected by the key value shown as "non-default" in each of States 4 and 6.

State 2 is reached from a start or entry condition upon a replacement install of the control device 106 in the vehicle. State 2 includes the following values: the current machine mode is "service," the key value of the stored key is a default value, and the key is locked. Further, the update value is "denied." State 2 transitions to state 3 when an unlock command is received, thereby changing the key lock value to "unlocked."

State 3 includes the following values: the current machine mode is service, the key value of the stored key is a default value, and the key is unlocked. The "CMAC allowed" value is "denied" (see Equation 1). Further, the update value is "allowed." State 3 transitions to state 2 upon an event including a reset of a control device 106 that changes the key lock value to locked. State 3 transitions to state 4 upon an event including a receipt of a command to update the key and to lock the key lock the key in memory. Because the key value is unlocked in State 3, the key is updated to a non-default value supplied by the key update command as reflected by the key value shown as "non-default" in States 4; further, because of the lock command, the "lock" state value in State 4 is "locked."

Thus, State 4 includes the following values: the key is locked, the mode is "service," and the key is a non-default value. The "CMAC allowed" value is "allowed." Further, the update value is "denied." State 4 could represent a case in which the control device 106 has been maliciously or improperly installed in the vehicle 102, and a bad actor then attempts to update the security key to a key that would allow improper access to the vehicle 102 and/or the network 114 were the control devices 106 to update the key. Therefore, the control devices 106 deny CMAC authenticated communications and deny key updates. State 4 transitions to state 5 upon a command from a device 120 to change the key lock value from "locked" to "unlocked" so that the key may be updated.

State 5 includes the following values: the key is unlocked, the mode is "service," and the key is a non-default value. The "CMAC allowed" value is "allowed." Further, the update value is "allowed." State 5 transitions to state 2 upon receipt of a command updating the key to the default value and locking the key. State 5 also transitions to state 4 upon a command from the remote device 120 to update the key value from a non-default value to a new non-default value and lock the key. The control device 106 may also transition from state 5 to state 4 based on a transition event including an ECU reset. As per Table 2, the ECU reset locks the key because the mode is service.

State 6 includes the following values: the key is unlocked, the mode is "initial", and the key is a non-default value. The "CMAC allowed" value is "allowed." Further, the update value is "allowed." State 6 transitions to state 4 upon receipt of a command to unlock the key as well as a change of mode to "service." In one example, this command is a "force counter synch" (FCS) command. An FCS command may occur when the vehicle 102 in initial mode has had all control devices 106 installed, and the control devices 106 are to be set, or forced, into a service mode. Accordingly, the FCS command locks the key and changes the mode from initial to service. The State 6 transitions to state 1 upon receipt of a command to reset the key value to a default value. State 6 transitions to state 2 upon receipt of a command from the device 120 updating the key to the default value and locking the key.

State 7 represents an error state having the following values: that the key is "locked," the mode is "initial," the key is a default value. The "CMAC allowed" value is "denied." Further, the update value is "denied." The control device 106 may enter State 7 as a result of some error in the operation of control device 106 (e.g., as might be caused by an unexpected fluctuation of electrical power (or what may be referred to as a "glitch")). Upon a device reset command, the control device 106 transitions to State 2 from State 7.

State 8 represents a second error state. State data in state 8 is the same as in state 7, except that in State 8 the security key has a non-default key value. Upon a device reset command, the control device 106 transitions to State 4 from State 8.

Example Processes

Figure 4:
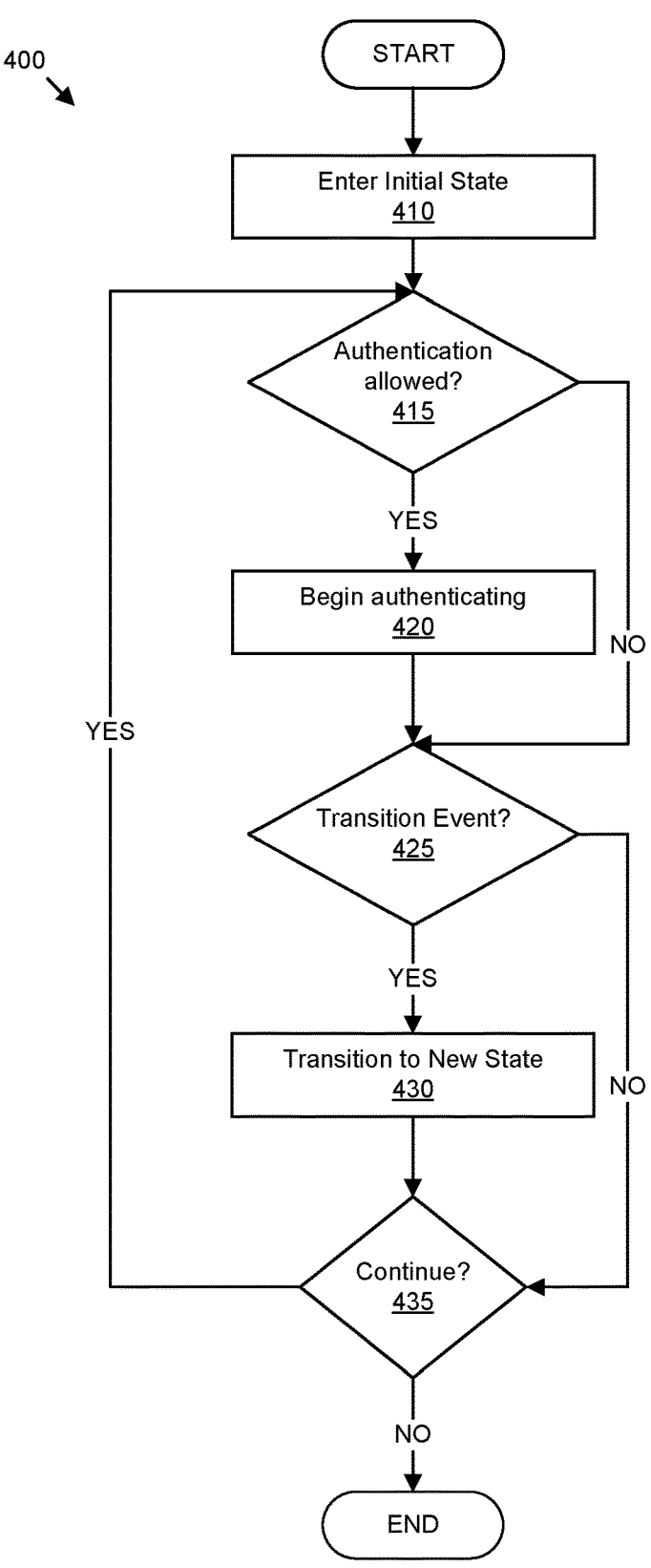
FIG. 4 a process flow diagram of an example process for computing devices to operate via a network according to a state machine.

FIG. 4, described with reference to the elements of FIGS. 1-3 which are described above, shows a process flow diagram of an example process 400 for computing devices 104, 106, 108 to operate, including to receive commands (such as a command to update a security key) and to send and/or receive messages via the network 114, 118 according to a state machine. The process can be carried out according to program instructions executed by the computing device 104, 106, 108 such as the control device 106 (i.e., program instructions for a state machine such as the state machine could be implemented in a computing device 104, 106, 108 such as a control device 106) which could be a controller or ECU or the like that communicates via the vehicle network 114. Accordingly, process 400 is explained with reference to the control device 106.

The process 400 begins in a block 410 when the state machine being executed in the control device 106 enters an initial state from a start condition. For example, in the state machine of FIG. 3, the start condition is the installation of a new device 106. The initial state could be state 1, for a new or first install (e.g., when a vehicle is being manufactured and components including control devices 106 are initially installed). Further, the initial state could be state 2, for a replacement install (e.g., when a vehicle has been previously manufactured and placed in service, and components including devices 106 are initially installed).

Next, in a decision block 415, the control device 106 executing the state machine determines whether authentication of messages received in the control device 106 is allowed in the current state, which could be the initial state or could be a second or subsequent state. In the example of the state machine, determining whether authentication of messages was allowed would mean checking whether CMAC was "allowed" or "denied." If the control device 106 determines that authentication of messages is allowed in the current state, then a block 420 follows the block 415. If authentication of messages is not allowed, then a block 425 is executed next.

In the block 420, the control device can begin authenticating messages received or detected via the vehicle network 114. For example, a stored key value (key_val in the example of FIG. 3) may be a value for a security key that can be used to perform authentication such as CMAC authentication.

In the decision block 425, which may follow either of the blocks 415, 420, the control device 106 determines whether a transition event has been detected. If a transition event is detected, the process continues to block 430. Otherwise, the process continues to a block 435.

In the block 430, the state machine transitions to a second or subsequent state from the initial state in response to the transition event. The transitioned-to state may also be referred to as a "new" state in the sense that it is a state other than the current state of the block 425.

In block 440, the control device 106 determines whether to continue the process. The process 400 could be terminated by an external input or action. When implemented in the vehicle 102, for example, the control device 106 may execute process 400 as long as the vehicle 102 is in an ignition ON state. If the process 400 continues, then the process 400 returns to the block 415. Otherwise, the process 400 ends following the block 435.

Figure 5:
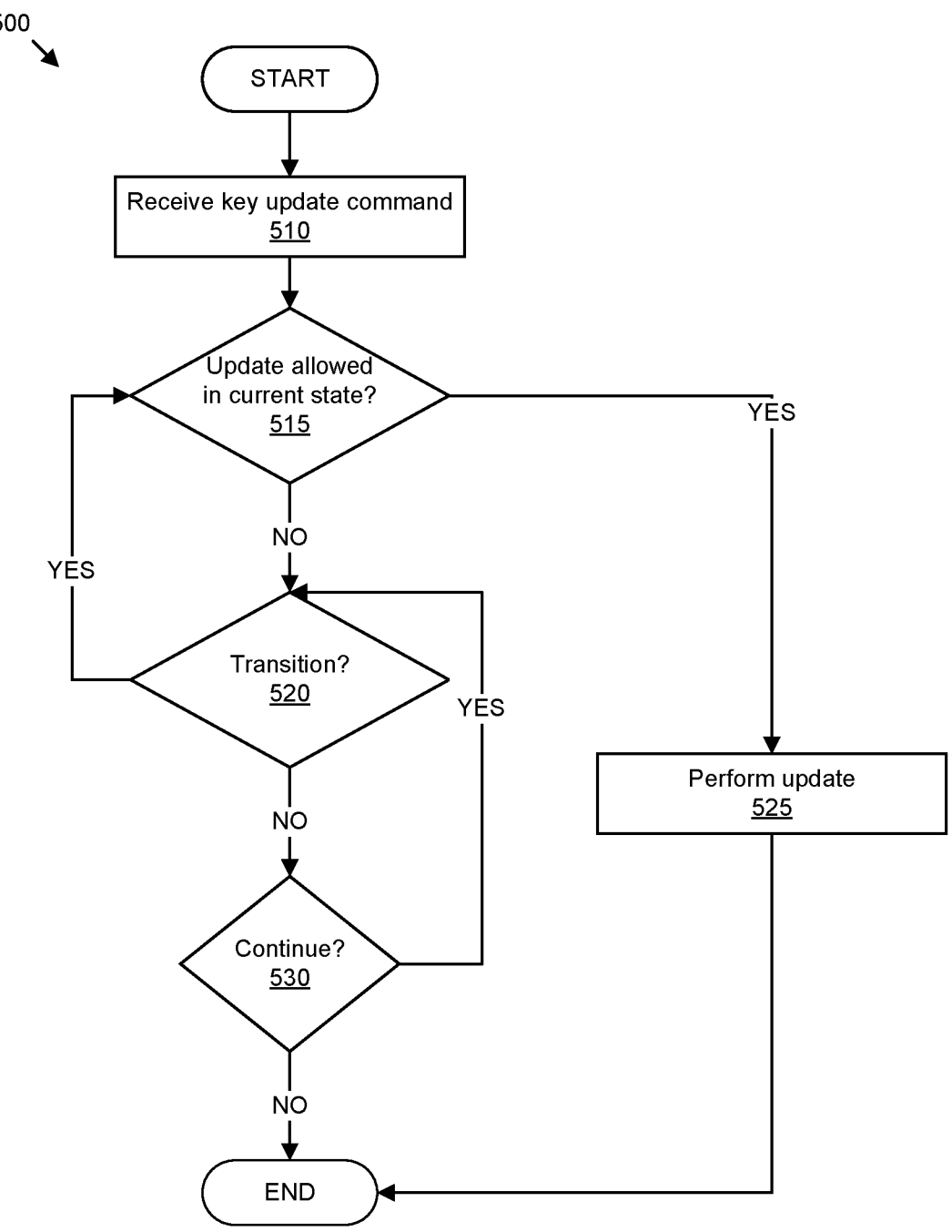
FIG. 5 is a process flow diagram illustrating an example process for managing key distribution according to a state machine.

FIG. 5, described with reference to the elements of FIGS. 1-3 which are described above, is a process flow diagram illustrating an example process 500 for managing key distribution according to a state machine. The process 500 can be implemented and carried out, for example, by the control device 106 of the vehicle 102. For example, the process 500 may be carried out in the context of the process 400 described above. For example, when the device 106 receives or determines a transition event in the block 425, that transition event could include a key update command.

The process 500 begins in a block 510, in which the control device 106 receives a key update command.

Next, in a decision block 515, the control device 106 determines whether an update is allowed in a current state. As explained above, the control device 106 may determine a current state based on state data values. For example, on receiving a key update command the control device 106 could determine that a current state is a state with the update allowed value being "allowed." In the example of FIG. 3, this could be any of states 1, 3, 5, or 6. The control device 106 could alternatively determine that a current state is a state with the update allowed value being "denied." In the example of FIG. 3, this could be any of states 2, 4, 7, or 8. If the current state does not allow for a key update the process 500 continues to a decision block 520. Otherwise, the process 500 continues to a block 525.

In the decision block 520, the control device 106 determines whether a transition event has occurred (i.e., an event to transition the state machine in the control device 106 to a new state (i.e., a second state following the first or current state evaluated in the block 515)). If a transition event has occurred, the process 500 returns to the block 515. Otherwise, the process 500 continues to a block 530.

In the block 525, which may follow the block 515, the control device 106 has transitioned to or is in a state which allows the key to be updated. The control device 106 accordingly performs a key update. The key update may reset the key value to the default value, update the key value from the default value to a non-default value, or update the non-default value (e.g., as described above). The process 500 then ends following the block 525.

In the block 530, following decision block 520, the control device 106 determines whether to continue the process 500. The process 500 could be terminated by an external input or action, for example. When implemented in the vehicle 102, for example, the control device 106 may execute process 500 as long as the vehicle 102 is in an ignition ON state. Thus, the process 500 could be ended by the vehicle 102 transitioning to an ignition OFF state. If the process 500 continues, then the process 500 returns to the block 520. Otherwise, the process 500 ends following the block 530.

Computing devices 104, 106, 108 such as those discussed herein generally each includes commands executable by one or more computing devices 104, 106, 108 such as those identified above, and for carrying out blocks or steps of processes described above. For example, process blocks discussed above may be embodied as computer executable commands.

Computer executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor 116 (i.e., a microprocessor) receives commands (i.e., from a memory, a computer readable medium, etc.), and executes these commands, thereby performing one or more processes, including one or more of the processes described herein. Such commands and other data may be stored in files and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer.

Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Use of in response to, based on, and upon determining herein indicates a causal relationship, not merely a temporal relationship. "Based on" or "in response to" can mean based at least partly on or at least partly in response to unless explicitly stated otherwise.

Examples are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. It will be understood that the usage of the terms "first" and "second" are merely identifying and not necessarily indicative of priority.

The invention claimed is:

1. A system, comprising a computing device, the computing device including a processor and a memory, the memory storing instructions executable by the processor, including instructions to:

receive a key update command to update a key value for a cryptographic key; and in response to the key update command, update the key value upon determining that the computing device is in a first state based on state data defining the first state, the state data including the key value, a machine mode specifying a current operating environment, and a lock value specifying that memory storing the key value is one of locked or unlocked.

2. The system of claim 1, wherein the instructions further include instructions to transition to a second state after updating the key value.

3. The system of claim 2, wherein the instructions further include instructions to allow the computing device to authenticate communications with the key value based on the second state.

4. The system of claim 2, wherein the machine mode changes from the first state to the second state.

5. The system of claim 1, wherein the first state is a default state and a key value in the default state is a default value.

6. The system of claim 1, wherein the computing device is configured for communication with a second computing device via a network.

7. The system of claim 1, further comprising a gateway computing device configured to provide the key update command, via the network, to the computing device.

8. The system of claim 7, wherein the gateway is further configured to provide the key update command based on determining that the computing device is in the first state.

9. The system of claim 1, wherein the computing device is an electronic control unit (ECU) for a vehicle.

10. The system of claim 1, the instructions further including instructions to transition to the first state from an error state.

11. A method comprising:

receiving a key update command to update a key value for a cryptographic key; and in response to the key update command, updating the key value upon determining that the computing device is in a first state based on state data defining the first state, the state data including the key value, a machine mode specifying a current operating environment, and a lock value specifying that memory storing the key value is one of locked or unlocked.

12. The method of claim 11, further comprising transitioning to a second state after updating the key value.

13. The method of claim 12, further comprising allowing the computing device to authenticate communications with the key value based on the second state.

14. The method of claim 12, wherein the machine mode changes from the first state to the second state.

15. The method of claim 11, wherein the first state is a default state and a key value in the default state is a default value.

16. The method of claim 11, wherein the computing device is configured for communication with a second computing device via a network.

17. The method of claim 11, further comprising a gateway computing device configured to provide the command to update the key value, via the network, to the computing device.

18. The method of claim 17, wherein the gateway is further configured to provide the key update command based on determining that the computing device is in the first state.

19. The method of claim 11, wherein the computing device is an electronic control unit (ECU) for a vehicle.

20. The method of claim 11, further comprising transitioning to the first state from an error state.

* * * * *